(12) United States Patent
Cheng et al.

(10) Patent No.: US 10,754,456 B2
(45) Date of Patent: Aug. 25, 2020

(54) POWER-EFFICIENT TOUCH INPUT PROCESSING

(71) Applicant: Intel Corporation, Santa Clara, CA (US)

(72) Inventors: Antonio S. Cheng, Portland, OR (US); Yifan Li, Beaverton, OR (US); Paul Diefenbaugh, Portland, OR (US); Vishal Sinha, Portland, OR (US); Kathy Bui, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/232,283

(22) Filed: Dec. 26, 2018

(65) Prior Publication Data

US 2019/0129526 A1    May 2, 2019

(51) Int. Cl.
*G06F 3/041* (2006.01)
*G06F 1/3234* (2019.01)
*G06F 3/0488* (2013.01)

(52) U.S. Cl.
CPC ............ *G06F 3/041* (2013.01); *G06F 1/3262* (2013.01); *G06F 3/0416* (2013.01); *G06F 3/04883* (2013.01)

(58) Field of Classification Search
CPC .... G06F 3/041; G06F 3/0416; G06F 3/04883; G06F 1/3262
See application file for complete search history.

(56) References Cited

U.S. PATENT DOCUMENTS

2011/0216016 A1* 9/2011 Rosener .................. G06F 3/041
345/173

* cited by examiner

*Primary Examiner* — Lisa S Landis
(74) *Attorney, Agent, or Firm* — Schwegman Lundberg & Woessner, P.A.

(57) ABSTRACT

A method for power-efficient touch input, in which touch sensor data from a touch input is obtained by touch circuitry. Touch sensor data is obtained from touch input at touch circuitry included in a device that also includes a system-on-a-chip (SOC) and a display controller stack outside of the SOC. The touch sensor data is stored in a buffer. When the SOC is in a low-power state, the touch sensor data is communicated to the display controller stack for immediate display.

24 Claims, 7 Drawing Sheets

POWER-EFFICIENT TOUCH INPUT PROCESSING

BACKGROUND

Computing devices commonly have input devices known as touch screens or touch displays layered on top of their visual display. The advent of digital technology has introduced a variant to traditional writing or drawing techniques referred to herein as digital writing.

Digital writing involves the use of a computer input tool, such as a stylus, to indicate user strokes that are similar to those used in traditional writing. The computer then converts those strokes into a representation that may be visible on a screen. This action may also be referred to as digital inking, regardless of whether the representation resembles pencil, paint, chalk, charcoal, or ink when visibly rendered.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Writing or drawing has traditionally been accomplished by applying a material onto a surface. For example, a pencil used to spread graphite onto paper or a brush to spread paint onto canvas. Traditional techniques have evolved many different tools to apply the material to a variety of surfaces. Digital writing offers many advantages over writing on a substrate, such as paper, a chalkboard, etc. Specifically, writing and drawing on a touch enabled device such as a tablet or smartphone may provide many advantages over writing on paper, such as instant transcribing, writing recognition, beautification, and allowing a user to store and share material digitally in an instant. It is desirable to enable digital inking to operate similarly to traditional techniques to meet user expectations established by traditional writing techniques. Issues such as writing feel (e.g., friction between the stylus and the touch medium), stylus design, and inking latency may all affect the user's perception of a digital inking system.

Inking latency is a particular problem in power constrained devices, such as battery operated mobile phones or tablets. Reducing inking latency generally involves greater power output to sense stylus activity. For example, continuous inking by a stylus on a digital writing capable device may have a 60% higher peak power compared to indirect mouse input. As display panels increase their refresh rates to improve user experience, the power consumption during digital inking will further increase. Thus, digital inking is generally feasible only for light usage in power constrained devices. To achieve always-on low-latency digital inking (e.g., for taking notes), a marked reduction in power consumption is necessary.

Various techniques have been tried to address the power problem while still providing acceptable inking latencies. For example, sub-component latencies have been reduced. Here, for example, when an active stylus input enters a device via a touch sensor, a dedicated processing pipeline allows pen input to achieve a lower input latency. In another example of sub-component latency reduction involving liquid crystal displays, output latency may be reduced by improving liquid crystal pixel flipping speed. This example masks the operating system (OS) and application latency and may be implemented at the software, display pipe, or board level. For example, at the software level, the OS may bypass application and graphics composition by directly rendering ink strokes to a display front buffer. At the display pipe level, the input device driver may pre-render ink strokes to the display overlay. At the board level, the touch sensor may send side-band data to a display controller which pre-renders ink strokes on the display driver buffer.

Existing techniques for reducing sub-component latency do not reduce the latency contributions from the OS or the application. Further, these techniques generally increase the amount of power used by the device to implement the latency reductions. To address these issues, a low-latency low-power digital inking user experience is achieved by a dual-path touch-to-display pipeline. One path is the so-called "fast path" in which the touch sensor data bypasses the processor (e.g., System on a Chip (SOC)) on its way to the display. The second path is the so called "slow path" where the touch sensor data is held for the SOC while in a low-power state and provided to the SOC upon waking. This is referred to as the "slow path" because the wake cadence (e.g., number of times the SOC is brought out of a low-power state) is lower than for the touch sensing or the display controller stack. In this manner, the cadence (e.g., duty cycle) of the touch input, the SOC, and the display may be different, enabling a responsive, low-latency digital inking experience for the user and power savings for the device. Additional details and examples are described below.

In the following disclosure, numerous specific details are set forth, which may include examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It may be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Figure 1:
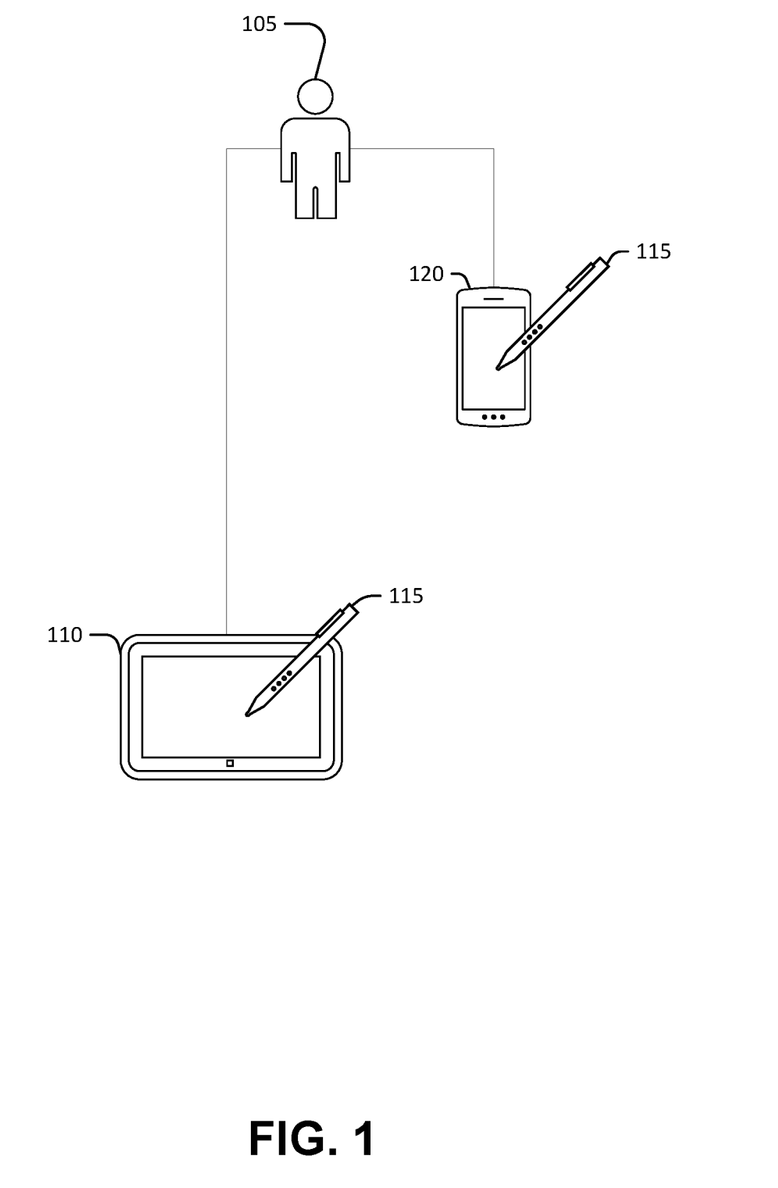
FIG. 1 is a block diagram of an example user digital inking upon which the power-efficient touch inker may be used, according to an embodiment.

FIG. 1 is a block diagram of an example user digital inking upon which the power-efficient touch inker may be used, according to an embodiment. FIG. 1 shows the types of devices an embodiment of the present disclosure may apply to. The power-efficient touch input may be implemented in devices with a touch display that a user 105 may employ to take digital notes, paint, or the like. The display devices (e.g., tablet 110 or mobile phone 120) may include a display screen that that is a built-in component of a platform that includes an SOC. Examples of these devices include the tablet computing device 110, or the mobile phone 120, or 2-in-1 computers.

Embodiments of the present disclosure may work with an unmodified stylus (e.g., pen) 115, touch input, and display components. The stylus 115 may be any implement including a finger, a passive stylus, or an active stylus. In an example, an active stylus may provide an electrical even signal to the display device upon certain actions including touching or pressure sensed by the stylus 115.

In an example, a touch integrated circuit (IC) may collect the raw touch or stylus data and send it to a graphical processing unit (GPU) via a dedicated hardware path. A touch or stylus algorithm from a third-party touch vendor may be executed in the touch device. These touch or stylus algorithms may convert the raw sensor data into screen coordinates depicting the touch points. The final processed data may be sent to the operating system.

Figure 2A:
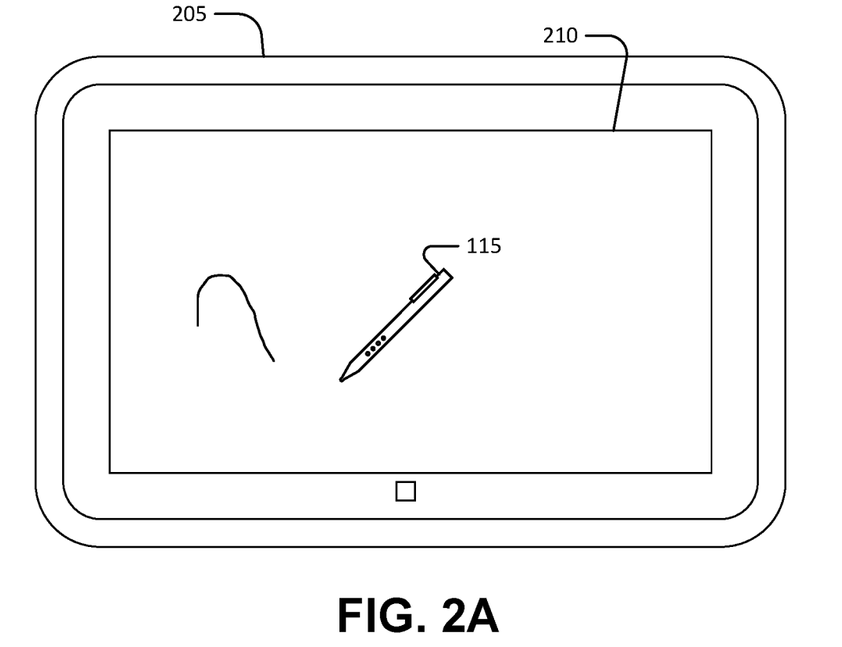
FIGS. 2A and 2B respectively illustrate an example comparison of the effects of inking without and with latency reduction for a touch display device, according to an embodiment.
Figure 2B:
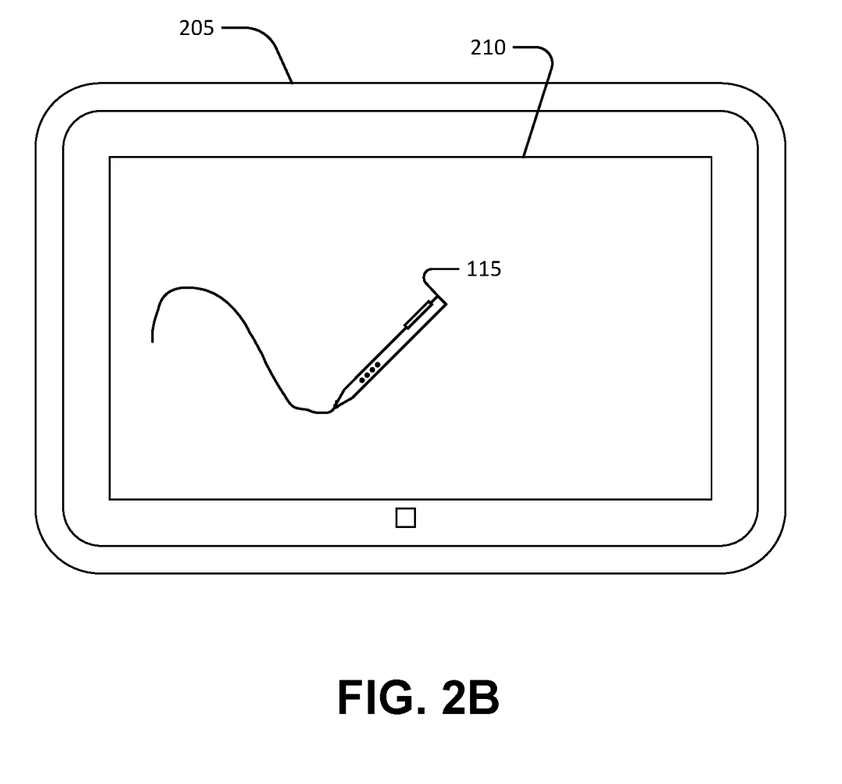

FIGS. 2A and 2B respectively illustrate an example comparison of the effects of inking without and with latency reduction for a touch display device, according to an embodiment. FIG. 2A illustrates a computing device 205 with a touchscreen 210 that is operating without low-power latency reduction. FIG. 2B illustrates the computing device 205 and the touch screen operating with low-power latency reduction.

With respect FIG. 2A, the computing device 205 demonstrates a distance between the stylus 115 position and the end of the inking. Here, the stylus 115 has been dragged across the touchscreen 210 to provide touch input, but the touchscreen only displays touch data which has had time to be processed by the OS, CPU, and writing application. This latency between time the touch input occurs and the time its representation appears on the touchscreen 210 reduces the similarity of digital inking to writing on a surface such as paper.

FIG. 2B demonstrates the result of using a low-latency inking technique. Here, the digital inking strokes match the stylus 115 position. Thus, the user does not perceive a lag between input and output on the touchscreen 210. This may more closely mimic the sensation of writing with a material on a surface.

Figure 3:
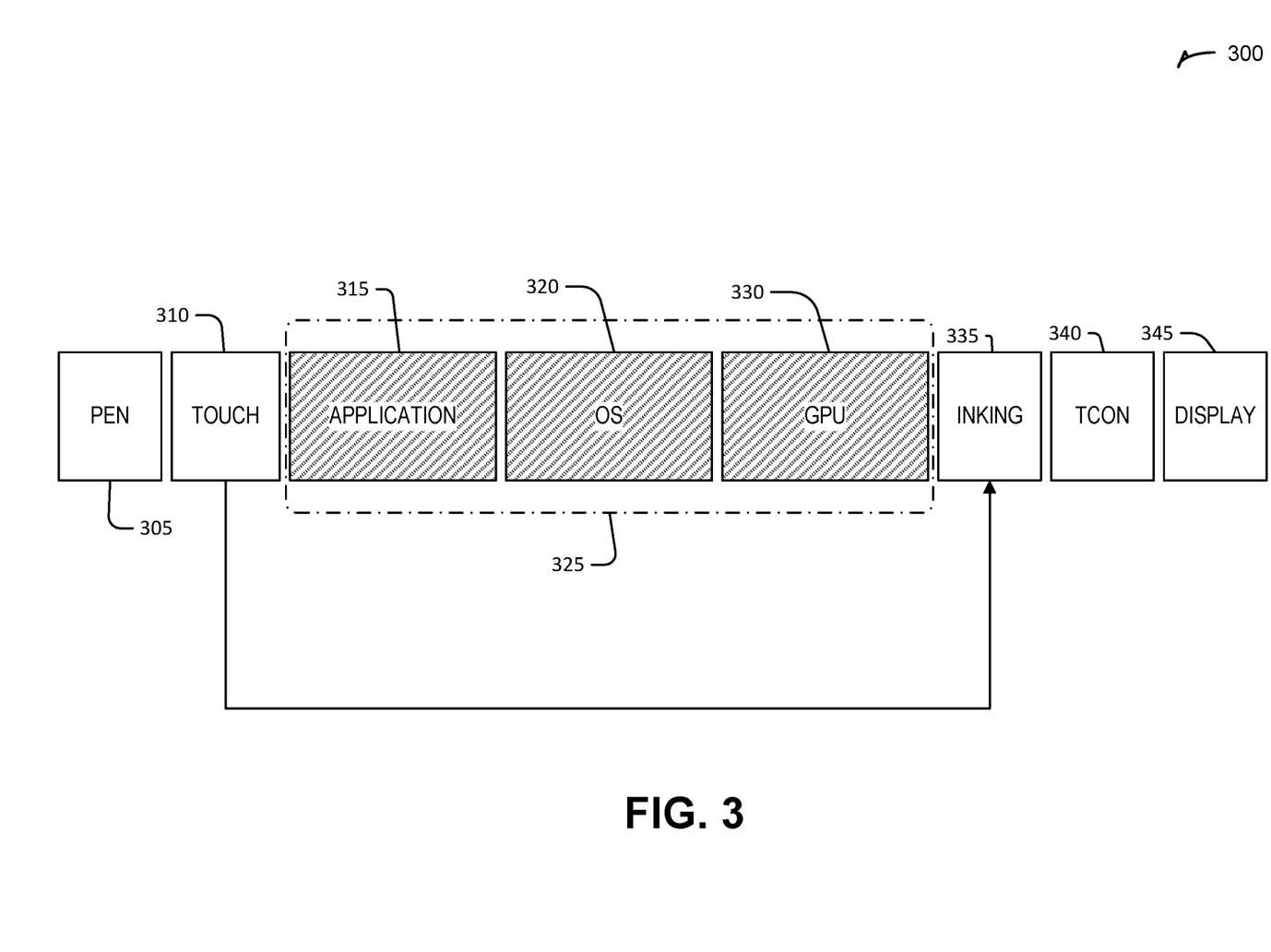
FIG. 3 illustrates an example of a digital inking end-to-end pipeline upon which power efficient touch inking may operate, according to an embodiment.

FIG. 3 illustrates an example of a digital inking end-to-end pipeline upon which power efficient touch inking may operate, according to an embodiment. FIG. 3 illustrates an example of intelligent filtering and energy efficient batching on a generic inking end-to-end pipeline 300. The pipeline 300 is divided into three portions: an input portion, a processing portion, and a display portion. The input portion includes a pen 305 and a touch stack 310. The touch stack 310 may include a touch surface, such as a capacitive screen, and processing circuitry to convert touches into pen inputs to be consumed by other portions of the device. In an example, the touch stack 310 may include processing circuitry to eliminate noise from the touch input data. Noise may include such things as erroneous touches, resting a user's hand upon the display, etc. In an example, the input portion operates at a wake cadence of two-hundred sixty-six hertz.

The processing portion runs on a central processor, such as an SOC 325. The SOC 325 may include a central processing unit (CPU), memory controller, memory, graphics processing unit (GPU) 330, accelerators (e.g., a media decoder), input/output ports, and possibly other components integrated into a substrate (e.g., the chip). As illustrated, the SOC 325 implements an application 315 running on an operating system 320 that controls the GPU 330. Generally, for power efficiency, the lower the wake cadence of the processing portion, the greater the power savings. Thus, in an example, the processing portion has a wake cadence of between one and thirty hertz.

The display portion is a display controller stack. This stack includes display components that are distinct from the GPU 330 and the SOC 325. The display controller stack may implement such features as self-refresh to enable lower wake cadence for the processing portion. As illustrated here, the display controller stack includes inking circuitry 335, a display timing controller (TCON) 340, and the display 345. In an example, the display portion has a wake cadence between sixty and one-hundred twenty hertz.

The end-to-end pipeline 300 records touch sensor data from the pen 305 and communicates the touch sensor data to the touch stack 315. The so called "fast path" sends touch data to the inking circuitry 335 of the display controller stack to bypass the SOC 325 (e.g., processing portion). The inking circuitry 335 then composites the touch data with the buffered display data (e.g., previously created by the GPU 330) to immediately display the touch input on the display 345. During this time, the SOC 325 remains in a low-power state. The touch data is buffered (e.g., held) for the SOC 325 until it wakes. In an example, the SOC 325 may be triggered to wake from a low-power state to an active state by an application 320, OS 320, etc. At this time, the buffered touch data is communicated to the SOC 325 to be processed by the application 315, for example. The path through the SOC 325 enables the touch data to be acted upon by the application 315. Thus, if the user is taking notes, it is this path that enables the application 315 to record the touch input into the notes. However, due to the slower wake cadence of the SOC 325 than to either of the input portion or the display portion, it is a slower processing path.

The benefit of bypassing the SOC 325 to immediately display touch data to the display 345 includes low-latency update of the display 345. Specifically, the touch stack 310 and the display controller stack may both operate at significantly higher wake cadences than the SOC 325. Thus, low-power and low-latency digital inking is achieved.

The potential power savings which may be achieved by the present disclosure is shown in the table below. For example, consider a traditional SOC cadence of 133 hertz for a 266 hertz input duty cycle and display frame rate of 60 hertz. The table below illustrates the power savings of reducing the SOC cadence to 30 Hz and 1 Hz respectively, after establishing some baseline numbers.

| Configuration | Core (SOC + Memory) Power using Intel 7$^{th}$ Gen Core ™ (W) | % Power Saved |
|---|---|---|
| 60 Hz Active Writing Baseline | 2.46 | — |
| 60 Hz Display/w 30 Hz Slow SOC Path | 1.61 | 35% |
| 60 Hz Display/w 1 Hz Slow SOC Path | 1.06 | 57% |

Overall platform power saving may be moderated by user activity. For a device which is used primarily for note taking, battery life improvement may be more noticeable, but for lighter usage users may notice less device heating.

Figure 4:
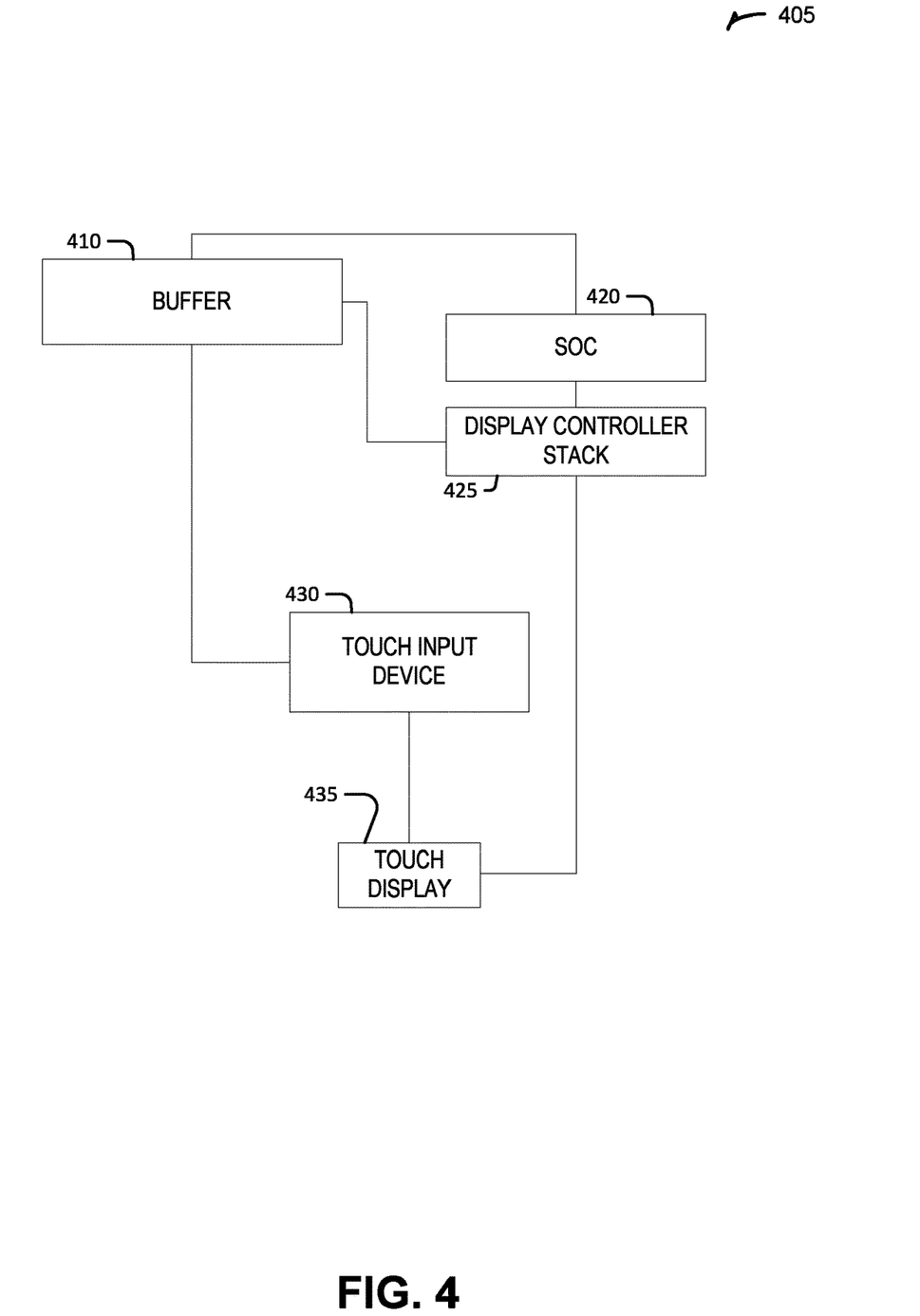
FIG. 4 illustrates a schematic diagram of an example of a system for power-efficient touch inking, according to an embodiment.

FIG. 4 illustrates a schematic diagram of an example of a system for power-efficient touch inking, according to an embodiment. FIG. 4 shows touch circuitry for power-efficient touch input. In operation, the device 405 may obtain touch sensor data from a touch input device 430. The touch sensor data is stored in a buffer 410. While the SOC 420 is in a low-power state, the touch sensor data in the buffer 410 is transmitted to the display controller stack 425, bypassing the SOC 420. The display controller stack 425 uses the touch sensor data to immediately update the touch display 435. In an example, parameters of the update may be provided to the display controller stack 425 from the SOC 420. Such parameters may include a color, pattern, size, or shape to represent the touch sensor input on the touch display 435. By bypassing the SOC 420, power use similar to batch techniques may be achieved with the low digital inking latencies of always-on digital inking techniques. This is the so-called fast path. Through this fast path, the data may be transferred to the display stack without being processed by the SOC. Although a visual representation of the touch sensor input is immediately displayed to the screen to give the user a low-latency digital inking experience, nothing further is done with the data in this path. The slow-path, involving the SOC 420 below, may make greater use of the touch sensor input.

When the SOC 420 transitions from a low-power state to an active state, the touch sensor data in the buffer 410 is sent to the SOC 420. This enables software, such as a drawing or note program, to capture the touch sensor input and processing it, such as by creating an imaging and saving it, performing optical character recognition to convert the touch sensor input into text, etc.

Using the SOC 420 compute cycle to perform unintentional touch filtering is possible but may negate the power benefit of using the fast path. Thus, in an example, unintentional touch interactions are filtered from the touch sensor data by a component of the touch input 430, the buffer 410, the display controller stack 425, or on a path in between these components without being sent to the SOC 420. However, parameters or the unintentional touch filtering may be established or programmed by the SOC 420 prior to its use in the fast path. User and system context information (from other system sensors or software) machine learning may be used to implement unintentional touch filtering.

In an example, the SOC 420 may be triggered (e.g., signaled) to wake to process the touch sensor input. In an example, the trigger to transition the SOC 420 from a low-power state to an active state is a current capacity of the buffer 410. In an example, the trigger is a current capacity above a certain threshold. In an example, the trigger is elapsed time exceeding a threshold. This elapsed time may be measured from a previous buffer 410 flush. In an example, the elapsed time may be measured from a beginning of the SOC 420 low-power state.

In an example, the threshold may be variable and set based on an activation frequency. In an example, the activation frequency may be between five and ten hertz inclusive.

In an example, the trigger to the SOC 420 to transition to the active state, the processing circuitry may be arranged to activate a hardware interrupt. The interrupt may be implemented using an electronic signal sent to the processing circuitry from the stylus.

In an example the trigger may be based upon a measurement performed by the touch circuitry. For example, the measurement may be an indication that the buffer is full. In another example the measurement may be a set period of time having elapsed.

The SOC 420 may be coupled to a touch display interface to connect to a touch display (not shown). The touch display interface may be a touch integrated circuit that collects raw touch or stylus sensor information from a touch display and send the touch input data to the buffer. The touch display includes touch sensors to detect the pressure of touch of a passive stylus, or the presence of an active stylus providing proximity and positioning data.

Figure 5:
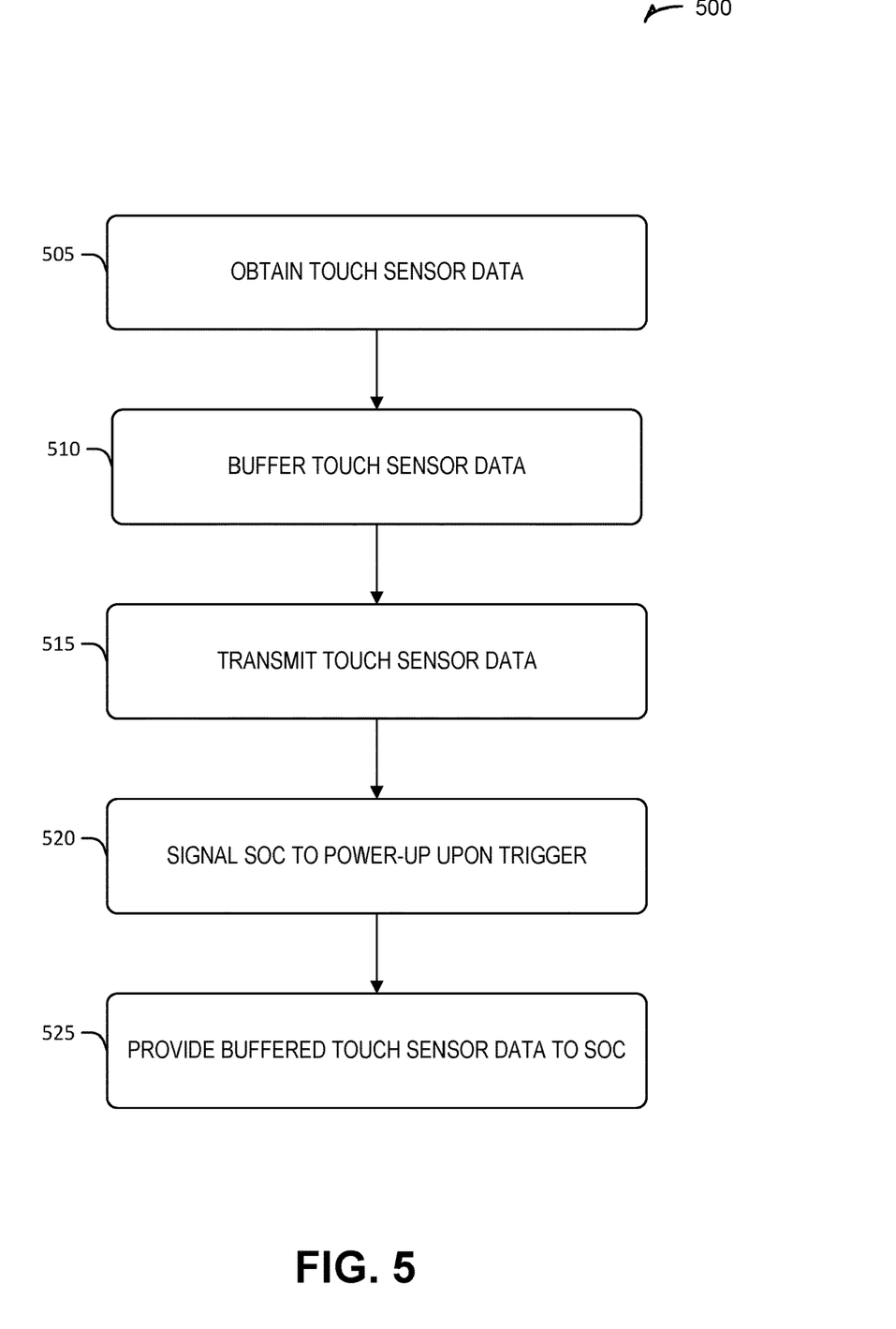
FIG. 5 illustrates a process flow diagram describing an example method for power-efficient fast inking, according to an embodiment.

FIG. 5 illustrates a process flow diagram 500 describing an example method for power-efficient fast inking, according to an embodiment. The operations of the process flow diagram 500 are performed by computer hardware, such as that described above or below (e.g., processing circuitry).

At operation 505, touch sensor data is obtained by touch circuitry from touch input. Here, the touch circuitry is included in a device—e.g., a tablet PC, a smart phone, PDA, or any similar device capable of touch input—that also includes a system-on-a-chip (SOC) for processing and a display controller stack that is outside of the SOC. In an example, obtaining the touch sensor data includes filtering the touch input. In an example, filtering the touch input includes classifying the touch input to eliminate noise. For example, an artificial neural network trained to recognize a touch pattern that conforms to a finger or a stylus may be used to identify and ignore noise in the touch input. In this example, sensor input that is not recognized as either a finger or a stylus is rejected. In an example, the noise includes an unintentional touch interaction, such as resting the side of the hand on a touch input surface.

At operation 510, the touch sensor data is stored in a buffer.

At operation 515, the touch sensor data is communicated to the display controller stack in response to detecting that the SOC is in a low-power state.

At operation 520, the SOC is signaled to transition from the low-power state to an active state upon a trigger. In an example, signaling the SOC to transition to the active state includes activating a hardware interrupt.

In an example, the trigger may be based on a measurement. For example, the measurement may be a current capacity of the buffer. In this example, the trigger may be a current capacity (e.g., free space in the buffer) being above a threshold. In another example, the measurement may be of data provided by at least one of an OS, an application, or a system sensor. In an example, the measurement may be an elapsed time. For example, the elapsed time may be measured from a previous buffer flush.

In an example, the elapsed time is measured from a beginning of the SOC low-power state. In an example, the trigger is the elapsed time being greater than a threshold. In an example, the threshold is variable and is set based on an activation frequency. In an example, the activation frequency is between one and thirty hertz inclusive.

At operation 525, the touch sensor data is provided to the SOC from the buffer in response to the SOC transitioning to the active state. In an example, providing the touch sensor data to the SOC from the buffer includes copying the touch sensor data from the buffer to memory of the SOC.

Figure 6:
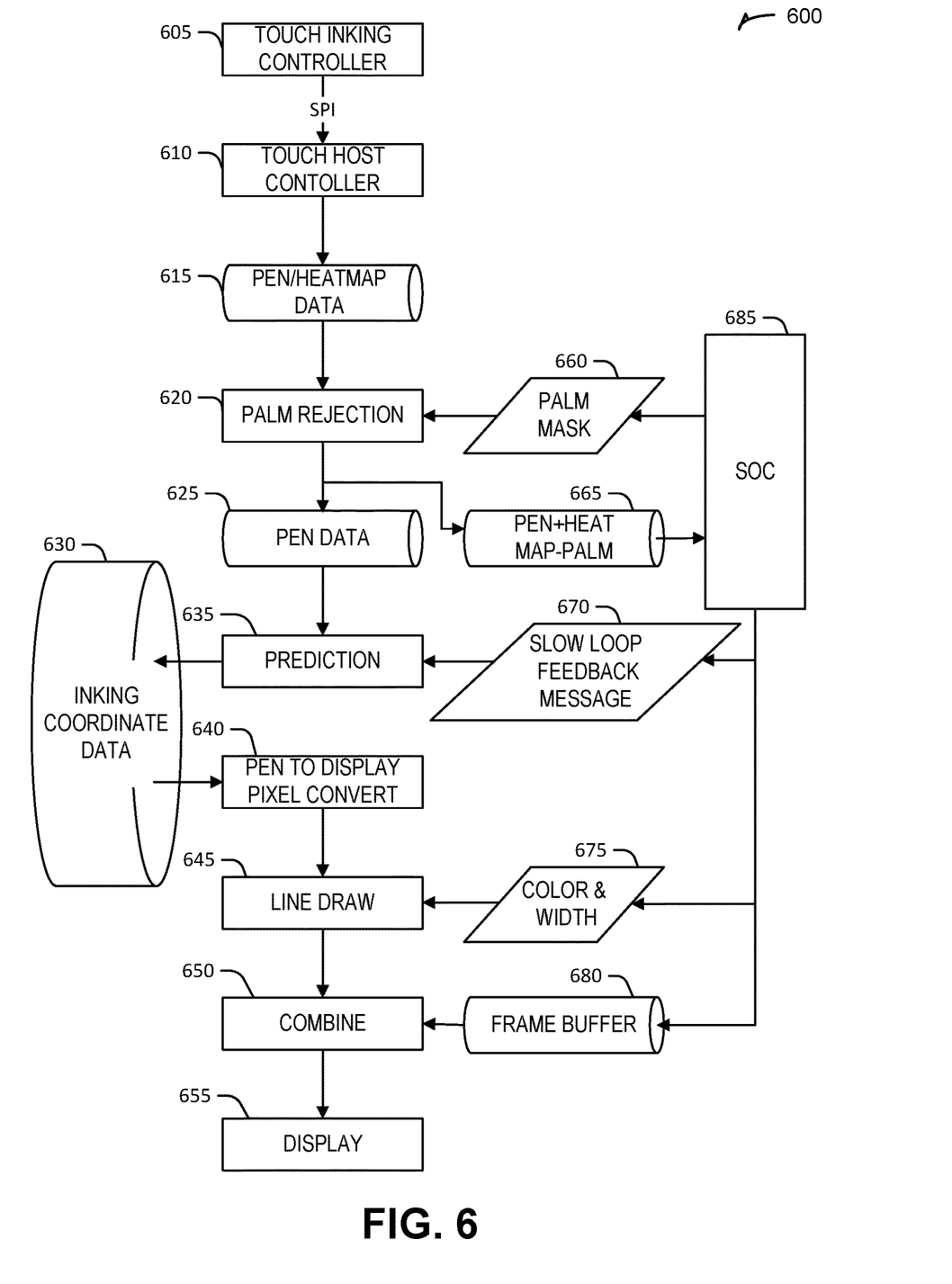
FIG. 6 illustrates a power-efficient fast inking data processing block diagram, according to an embodiment.

FIG. 6 illustrates a power-efficient fast inking data processing block diagram, according to an embodiment. FIG. 6 shows a reference data flow diagram 600 of an example of an implementation for a power-efficient touch display. The figure shows a possible embodiment of the so called "fast path." In the input inspecting, filtering, batching, and routing sub-flow, a touch inking controller 605 sends pen data to a touch host controller 610 at its native rate via a data bus. Here, routing sub-flow includes a touch inking controller 605, a touch host controller 610, a buffer to store pen/heatmap data 615, and palm rejection block 620.

The pen/heatmap data (which includes combined inking and noise data) may be stored in a buffer 615. The noise data may include unintentional touch data, such as data captured when another object, such as the palm or other part of a user's hand unintentionally contacts the touch display.

The palm rejection block 620 may filter out and remove the noise/unintentional touch data and pass the pen/inking data to another buffer 625. After the unintentional touch data is filtered out by the palm rejection block 620, it may be cloned and routed into the fast ink path or sent to the slow data path where it may be batched, stored in a separate buffer 665, and sent to the SOC 685.

A trained prediction algorithm 635 may project future pen position based on existing pen input data received from the buffer storing the pen data 625. Prediction may be needed to mask the remaining hardware related inking latency. Accuracy may be improved when the amount of prediction time required is short. In an example the prediction time may be less than 20 ms. The operating system or application may asynchronously inform the non-SOC inking components (e.g., the inking coordinate data 630, the converter 640, the line compositor 645, and the combinator 650) that older inputs have been processed and no longer need to be rendered—because they will now be handled by the SOC 685.

The remaining pen input coordinates and predicted coordinates may be stored as inking coordinate data in another buffer 630, and then may be converted into an ink stroke image at block 640. The ink stroke image may be based on the ink stroke attribute provided or extracted from the operating system or current foreground application.

When the slow loop is utilized, the SOC 685 may receive pen or touch related input data in batch mode when a compatible system context is recognized. After the batched touch input data is written into system memory, the wake interrupt may be sent to the CPU.

The SOC 685, may send palm mask data 660, into the palm rejection block 620, which may then be passed through the system as described above. The SOC 685 may also send a slow-loop feedback message 670 to the prediction block 635. This may inform the fast loop where the current inking location is positioned in the slow loop.

The SOC 685, may also, after being triggered into an active state, pass color and width data 675 which may be combined with the converted ink stroke image from box 640 to create a line draw 645. The SOC 685, may also pass data into a frame buffer 680, which will then be combined with the line draw 645, at block 650, and then sent to the display 655.

In an example, the fast inking hardware may be informed when the pen input data arrives, and which touch reports have been processed in the slow loop. In this case the fast loop may retire touch input reports which have been processed in the slow loop.

Figure 7:
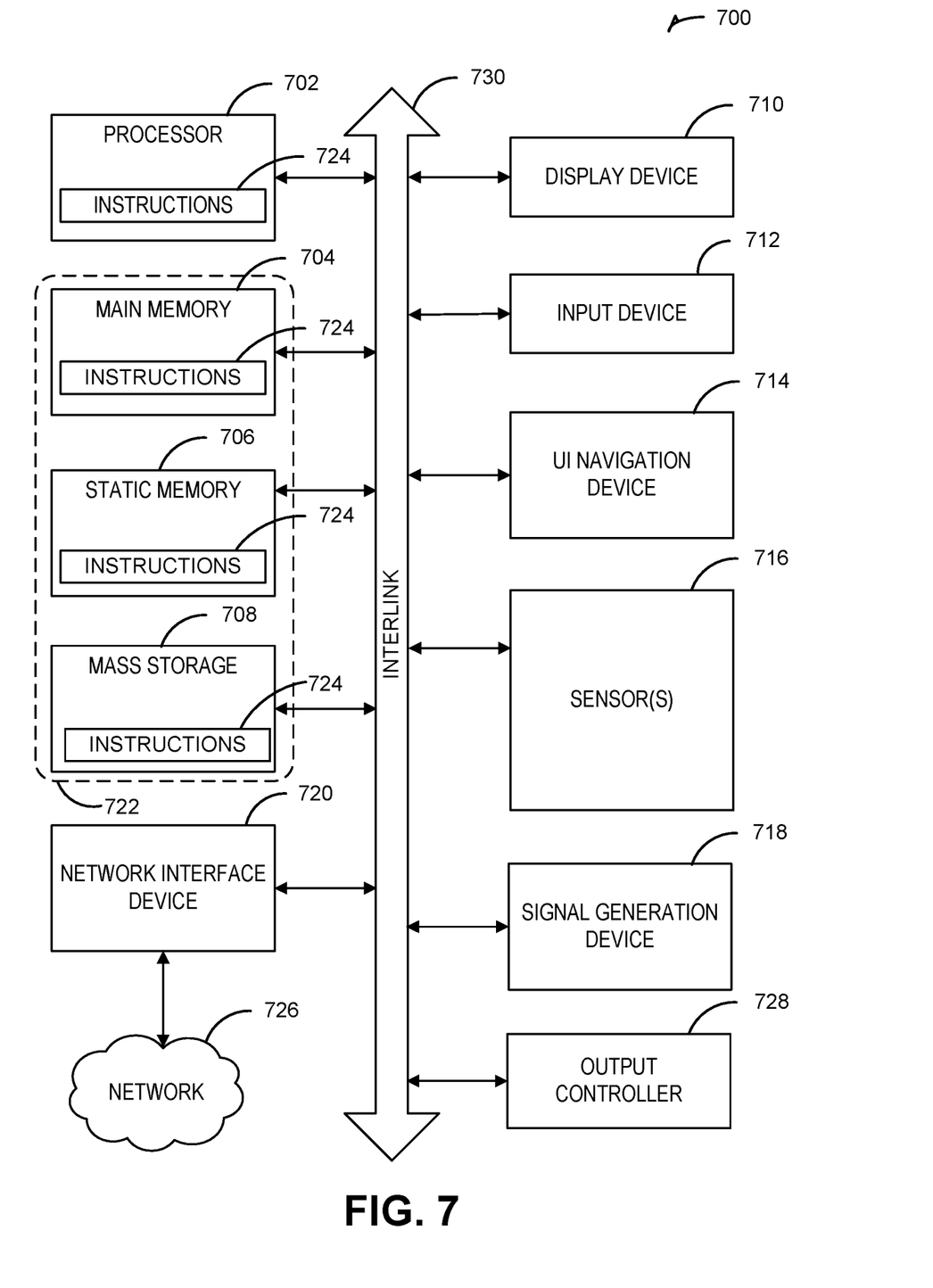
FIG. 7 illustrates generally an example of a block diagram of a machine upon which any one or more of the techniques (e.g., methodologies) discussed herein may perform in accordance with some embodiments.

FIG. 7 illustrates generally an example of a block diagram of a machine 700 upon which any one of more of the techniques (e.g., methodologies) discussed herein may perform in accordance with some embodiments. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may be a personal computer (PC), a tablet PC, a set-top box (STB), a personal digital assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, wherein the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate to each other via an interlink (e.g., bus) 730. The machine 700 may further include a display device 710, an alphanumeric input device 712 (e.g., a keyboard), and a user interface (UI) navigation device 714 (e.g., a stylus). In an example, the display device 710, alphanumeric input device 712 and UI navigation device 714, may be a touch screen display. The machine 700 may additionally include a storage device (e.g., drive unit) 708, a signal generation device 618 (e.g., a speaker), a network interface device 720, and one of more sensors 716, such as a global positioning system (GPS) sensor, compass, accelerometer, or other sensor. The machine 700 may include an output controller 728, such as a serial (e.g., universal serial bus USB), parallel, or other wired or wireless (e.g., infrared (IR), near field communication (NFC), etc.) connection to communicate or control one or more peripheral devices (e.g., a printer, card reader, etc.).

The storage device 708 may include a machine readable medium 722 this is non-transitory on which is store one or more sets of data structures or instructions 724 (e.g., software) embodying or utilized by any one or more of the techniques or functions described herein. The instructions may also reside, completely or at least partially, within the main memory 704, the static memory, 706, or within the hardware processor 702, during execution thereof by the machine 700. In an example, one or any combination of the hardware processor 702, the main memory 704, the static memory 706, or the storage device 708 may constitute machine readable media.

While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 is a apparatus for power-efficient touch input, the apparatus comprising: a buffer; and processing circuitry to: obtain, by touch circuitry, touch sensor data from touch input, the touch circuitry included in a device that also includes, a system-on-a-chip (SOC), a display controller stack outside of the SOC, the buffer and the processing circuitry; store the touch sensor data in the buffer; communicate, when the SOC is in a low-power state, the touch sensor data to the display controller stack for immediate display; signal, upon a trigger, the SoC to transition from the low-power state to an active state, the trigger based on a measurement; and provide, in response to the SOC transitioning to the active state, the touch sensor data to the SOC from the buffer.

In Example 2, the subject matter of Example 1 includes, wherein the measurement is a current capacity of the buffer.

In Example 3, the subject matter of Example 2 includes, wherein the trigger is a current capacity above a threshold.

In Example 4, the subject matter of Examples 1-3 includes, wherein the measurement is an elapsed time.

In Example 5, the subject matter of Example 4 includes, wherein the elapsed time is measured from a previous buffer flush.

In Example 6, the subject matter of Examples 4-5 includes, wherein the elapsed time is measured from a beginning of the SOC low-power state.

In Example 7, the subject matter of Examples 4-6 includes, wherein the trigger is the elapsed time being greater than a threshold.

In Example 8, the subject matter of Example 7 includes, wherein the threshold is variable and set based on an activation frequency.

In Example 9, the subject matter of Example 8 includes, wherein the activation frequency is between one and thirty hertz inclusive.

In Example 10, the subject matter of Examples 1-9 includes, wherein, to signal the SOC to transition to the active state, the processing circuitry activates a hardware interrupt.

In Example 11, the subject matter of Examples 1-10 includes, wherein the measurement is of data provided by at least one of an operating system (OS), an application, or a system sensor.

In Example 12, the subject matter of Examples 1-11 includes, wherein, to obtain the touch sensor data, the processing circuitry filters the touch input.

In Example 13, the subject matter of Example 12 includes, wherein, to filter the touch input, the processing circuitry classifies the touch input to eliminate noise.

In Example 14, the subject matter of Example 13 includes, wherein the noise includes an unintentional touch interaction.

In Example 15, the subject matter of Examples 13-14 includes, wherein, to provide the touch sensor data to the SOC from the buffer, the processing circuitry copies the touch sensor data from the buffer to memory of the SOC.

Example 16 is a method for power-efficient touch input, the method comprising: obtaining touch sensor data from touch input, the touch sensor data provided by touch circuitry included in a device that also includes, a system-on-a-chip (SOC) and a display controller stack outside of the SOC; storing the touch sensor data in a buffer; communicating, when the SOC is in a low-power state, the touch sensor data to the display controller stack for immediate display; signaling, upon a trigger, the SoC to transition from the low-power state to an active state, the trigger based on a measurement; and providing, in response to the SOC transitioning to the active state, the touch sensor data to the SOC from the buffer.

In Example 17, the subject matter of Example 16 includes, wherein the measurement is a current capacity of the buffer.

In Example 18, the subject matter of Example 17 includes, wherein the trigger is a current capacity above a threshold.

In Example 19, the subject matter of Examples 16-18 includes, wherein the measurement is an elapsed time.

In Example 20, the subject matter of Example 19 includes, wherein the elapsed time is measured from a previous buffer flush.

In Example 21, the subject matter of Examples 19-20 includes, wherein the elapsed time is measured from a beginning of the SOC low-power state.

In Example 22, the subject matter of Examples 19-21 includes, wherein the trigger is the elapsed time being greater than a threshold.

In Example 23, the subject matter of Example 22 includes, wherein the threshold is variable and set based on an activation frequency.

In Example 24, the subject matter of Example 23 includes, wherein the activation frequency is between one and thirty hertz inclusive.

In Example 25, the subject matter of Examples 16-24 includes, wherein signaling the SOC to transition to the active state includes activating a hardware interrupt.

In Example 26, the subject matter of Examples 16-25 includes, wherein the measurement is of data provided by at least one of an operating system (OS), an application, or a system sensor.

In Example 27, the subject matter of Examples 16-26 includes, wherein obtaining the touch sensor data includes filtering the touch input.

In Example 28, the subject matter of Example 27 includes, wherein filtering the touch input includes classifying the touch input to eliminate noise.

In Example 29, the subject matter of Example 28 includes, wherein the noise includes an unintentional touch interaction.

In Example 30, the subject matter of Examples 28-29 includes, wherein providing the touch sensor data to the SOC from the buffer includes copying the touch sensor data from the buffer to memory of the SOC.

Example 31 is at least one machine readable medium including instructions for power-efficient touch input, the instructions, when executed by processing circuitry, cause the processing circuitry to perform operations comprising: obtaining touch sensor data from touch input, the touch sensor data provided by the touch circuitry included in a device that also includes, a system-on-a-chip (SOC) and a display controller stack outside of the SOC; storing the touch sensor data in a buffer; communicating, when the SOC is in a low-power state, the touch sensor data to the display controller stack for immediate display; signaling, upon a trigger, the SoC to transition from the low-power state to an active state, the trigger based on a measurement; and providing, in response to the SOC transitioning to the active state, the touch sensor data to the SOC from the buffer.

In Example 32, the subject matter of Example 31 includes, wherein the measurement is a current capacity of the buffer.

In Example 33, the subject matter of Example 32 includes, wherein the trigger is a current capacity above a threshold.

In Example 34, the subject matter of Examples 31-33 includes, wherein the measurement is an elapsed time.

In Example 35, the subject matter of Example 34 includes, wherein the elapsed time is measured from a previous buffer flush.

In Example 36, the subject matter of Examples 34-35 includes, wherein the elapsed time is measured from a beginning of the SOC low-power state.

In Example 37, the subject matter of Examples 34-36 includes, wherein the trigger is the elapsed time being greater than a threshold.

In Example 38, the subject matter of Example 37 includes, wherein the threshold is variable and set based on an activation frequency.

In Example 39, the subject matter of Example 38 includes, wherein the activation frequency is between one and thirty hertz inclusive.

In Example 40, the subject matter of Examples 31-39 includes, wherein signaling the SOC to transition to the active state includes activating a hardware interrupt.

In Example 41, the subject matter of Examples 31-40 includes, wherein the measurement is of data provided by at least one of an operating system (OS), an application, or a system sensor.

In Example 42, the subject matter of Examples 31-41 includes, wherein obtaining the touch sensor data includes filtering the touch input.

In Example 43, the subject matter of Example 42 includes, wherein filtering the touch input includes classifying the touch input to eliminate noise.

In Example 44, the subject matter of Example 43 includes, wherein the noise includes an unintentional touch interaction.

In Example 45, the subject matter of Examples 43-44 includes, wherein providing the touch sensor data to the SOC from the buffer includes copying the touch sensor data from the buffer to memory of the SOC.

Example 46 is a system for power-efficient touch input, the system comprising: means for obtaining touch sensor data from touch input, the touch sensor data provided by the touch circuitry included in a device that also includes, a system-on-a-chip (SOC) and a display controller stack outside of the SOC; means for storing the touch sensor data in a buffer; means for communicating, when the SOC is in a low-power state, the touch sensor data to the display controller stack for immediate display; means for signaling, upon a trigger, the SoC to transition from the low-power state to an active state, the trigger based on a measurement; and means for providing, in response to the SOC transitioning to the active state, the touch sensor data to the SOC from the buffer.

In Example 47, the subject matter of Example 46 includes, wherein the measurement is a current capacity of the buffer.

In Example 48, the subject matter of Example 47 includes, wherein the trigger is a current capacity above a threshold.

In Example 49, the subject matter of Examples 46-48 includes, wherein the measurement is an elapsed time.

In Example 50, the subject matter of Example 49 includes, wherein the elapsed time is measured from a previous buffer flush.

In Example 51, the subject matter of Examples 49-50 includes, wherein the elapsed time is measured from a beginning of the SOC low-power state.

In Example 52, the subject matter of Examples 49-51 includes, wherein the trigger is the elapsed time being greater than a threshold.

In Example 53, the subject matter of Example 52 includes, wherein the threshold is variable and set based on an activation frequency.

In Example 54, the subject matter of Example 53 includes, wherein the activation frequency is between one and thirty hertz inclusive.

In Example 55, the subject matter of Examples 46-54 includes, wherein the means for signaling the SOC to transition to the active state include means for activating a hardware interrupt.

In Example 56, the subject matter of Examples 46-55 includes, wherein the measurement is of data provided by at least one of an operating system (OS), an application, or a system sensor.

In Example 57, the subject matter of Examples 46-56 includes, wherein the means for obtaining the touch sensor data include means for filtering the touch input.

In Example 58, the subject matter of Example 57 includes, wherein the means for filtering the touch input include means for classifying the touch input to eliminate noise.

In Example 59, the subject matter of Example 58 includes, wherein the noise includes an unintentional touch interaction.

In Example 60, the subject matter of Examples 58-59 includes, wherein the means for providing the touch sensor data to the SOC from the buffer include means for copying the touch sensor data from the buffer to memory of the SOC.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for power-efficient touch input, the apparatus comprising:
    a buffer; and
    processing circuitry to:
        obtain, by touch circuitry, touch sensor data from touch input, the touch circuitry included in a device that also includes a system-on-a-chip (SOC), a display controller stack separate from the SOC, the buffer and the processing circuitry;
        store the touch sensor data in the buffer;
        communicate, when the SOC is in a low-power state, the touch sensor data to the display controller stack for immediate display, wherein the touch sensor data is communicated directly from the buffer, bypassing the SOC, to the display controller stack;
        signal, upon a trigger, the SoC to transition from the low-power state to an active state, the trigger based on a measurement; and
        provide, in response to the SOC transitioning to the active state, the touch sensor data to the SOC from the buffer.

2. The apparatus of claim 1, wherein the measurement is an elapsed time.

3. The apparatus of claim 2, wherein the trigger is the elapsed time being greater than a threshold.

4. The apparatus of claim 3, wherein the threshold is variable and set based on an activation frequency.

5. The apparatus of claim 4, wherein the activation frequency is between one and thirty hertz inclusive.

6. The apparatus of claim 1, wherein, to obtain the touch sensor data, the processing circuitry filters the touch input.

7. The apparatus of claim 6, wherein, to filter the touch input, the processing circuitry classifies the touch input to eliminate noise.

8. The apparatus of claim 7, wherein the noise includes an unintentional touch interaction.

9. A method for power-efficient touch input, the method comprising:

obtaining touch sensor data from touch input, the touch sensor data provided by touch circuitry included in a device that also includes a system-on-a-chip (SOC) and a display controller stack outside of the SOC;

storing the touch sensor data in a buffer;

communicating, when the SOC is in a low-power state, the touch sensor data to the display controller stack for immediate display, wherein the touch sensor data is communicated directly from the buffer, bypassing the SOC, to the display controller stack;

signaling, upon a trigger, the SoC to transition from the low-power state to an active state, the trigger based on a measurement; and providing, in response to the SOC transitioning to the active state, the touch sensor data to the SOC from the buffer.

10. The method of claim 9, wherein the measurement is an elapsed time.

11. The method of claim 10, wherein the trigger is the elapsed time being greater than a threshold.

12. The method of claim 11, wherein the threshold is variable and set based on an activation frequency.

13. The method of claim 12, wherein the activation frequency is between one and thirty hertz inclusive.

14. The method of claim 9, wherein obtaining the touch sensor data includes filtering the touch input.

15. The method of claim 14, wherein filtering the touch input includes classifying the touch input to eliminate noise.

16. The method of claim 15, wherein the noise includes an unintentional touch interaction.

17. At least one non-transitory machine readable medium including instructions for power-efficient touch input, the instructions, when executed by processing circuitry, cause the processing circuitry to perform operations comprising:

obtaining touch sensor data from touch input, the touch sensor data provided by the touch circuitry included in a device that also includes a system-on-a-chip (SOC) and a display controller stack outside of the SOC;

storing the touch sensor data in a buffer;

communicating, when the SOC is in a low-power state, the touch sensor data to the display controller stack for immediate display, wherein the touch sensor data is communicated directly from the buffer, bypassing the SOC, to the display controller stack;

signaling, upon a trigger, the SoC to transition from the low-power state to an active state, the trigger based on a measurement; and providing, in response to the SOC transitioning to the active state, the touch sensor data to the SOC from the buffer.

18. The at least one machine readable medium of claim 17, wherein the measurement is an elapsed time.

19. The at least one machine readable medium of claim 18, wherein the trigger is the elapsed time being greater than a threshold.

20. The at least one machine readable medium of claim 19, wherein the threshold is variable and set based on an activation frequency.

21. The at least one machine readable medium of claim 20, wherein the activation frequency is between one and thirty hertz inclusive.

22. The at least one machine readable medium of claim 17, wherein obtaining the touch sensor data includes filtering the touch input.

23. The at least one machine readable medium of claim 22, wherein filtering the touch input includes classifying the touch input to eliminate noise.

24. The at least one machine readable medium of claim 23, wherein the noise includes an unintentional touch interaction.

* * * * *

UNITED STATES PATENT AND TRADEMARK OFFICE
CERTIFICATE OF CORRECTION

PATENT NO. : 10,754,456 B2
APPLICATION NO. : 16/232283
DATED : August 25, 2020
INVENTOR(S) : Cheng et al.

Page 1 of 1

It is certified that error appears in the above-identified patent and that said Letters Patent is hereby corrected as shown below:

In the Claims

In Column 14, Line 49, in Claim 1, delete "SoC" and insert --SOC-- therefor

In Column 15, Line 15, in Claim 9, delete "SoC" and insert --SOC-- therefor

In Column 16, Line 11, in Claim 17, delete "SoC" and insert --SOC-- therefor

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*